(12) United States Patent
Glahn et al.

(10) Patent No.: US 6,239,522 B1
(45) Date of Patent: May 29, 2001

(54) GENERATOR COOLING WITH MIXING DOWNSTREAM OF THE COOLER

(75) Inventors: Joern Glahn, Vernon, CT (US); Josef Baumgartner, Rain (CH); Michael Jung, Waldshut (DE)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/450,725

(22) Filed: Nov. 30, 1999

(30) Foreign Application Priority Data

Dec. 3, 1998 (DE) .............................. 198 56 455

(51) Int. Cl.⁷ ...................................................... H02K 9/08
(52) U.S. Cl. ................................ 310/63; 310/59; 310/58; 310/52
(58) Field of Search ................................ 310/52, 54, 55, 310/57, 58, 59, 60, 64, 65

(56) References Cited

U.S. PATENT DOCUMENTS 4,071,791 * 1/1978 Armor et al. ........................... 310/59

5,883,448 * 3/1999 Zimmerman ............................ 310/52

FOREIGN PATENT DOCUMENTS 27 24 422    1/1981  (DE) .
196 45 272   5/1998  (DE) .

* cited by examiner

*Primary Examiner*—Nestor Ramirez
*Assistant Examiner*—Judson H. Jones
(74) *Attorney, Agent, or Firm*—Burns, Doane, Swecker & Mathis, L.L.P.

(57) ABSTRACT

In a generator with a cooling system which draws in, from the generator, cooling medium heated by the heat-generating elements of the generator and which guides the hot cooling medium to at least two cooling units (23), which cooling units (23) operate in parallel and cool the cooling medium before it is led back to the heat-generating elements of the generator, operation substantially uninfluenced by failures of the cooling units (23) is made possible by means being provided which mix together the cooling medium flows (31) flowing from the different cooling units (23) after they emerge from the cooling units (23) and before they are supplied to the heat-generating elements of the generator.

10 Claims, 4 Drawing Sheets

GENERATOR COOLING WITH MIXING DOWNSTREAM OF THE COOLER

FIELD OF THE INVENTION

The present invention relates to the field of electrical generators. It relates to a generator with a cooling system which draws in, from the generator, cooling medium heated by the heat-generating elements of the generator and which guides the hot cooling medium to at least two cooling units, which cooling units operate in parallel, and in which cooling system the cooling units cool the cooling medium before it is led back to the heat-generating elements of the generator.

BACKGROUND OF THE INVENTION

In generators, the problem generally arises that the ventilation work carried out on the cooling medium, the rotor surface friction and, in particular, the electrical losses in the conductor windings and the stator laminae lead to a large development of heat. This demands efficient cooling of the central components of the generator.

In the current increasingly widespread high performance generators, the ventilation losses in particular increase because of the increasing peripheral velocities and this makes careful design of the cooling systems essential. In such cooling systems, a cooling medium—usually air or another gas, and also liquid media in special cases—is normally driven through the generator in a cooling circuit. The heat occurring at the hot components of the generator is transported away by the cooling medium and is extracted again from the cooling medium by means of cooling units at another location in the cooling circuit.

In generators which are operated on the suction cooling principle, the cooling medium heated by the heat-generating elements of the generator is drawn in from the generator by main fans fastened to the rotor shaft. These main fans are normally arranged at the front and rear ends of the generator and a ducting system guides the cooling medium expelled by the main fans through cooling ducts to a cooling arrangement, which is usually located under the generator in a foundation pit. Heat is then extracted from the cooling medium as it flows through the cooling arrangement extending essentially over the complete length of the generator and composed of a plurality of cooling units operating in parallel. The cold medium is then ducted back, over the complete length, to the heat-generating elements within the generator, thus forming a closed cooling circuit.

In order to meet the current demands for cooling in machines operating at their performance limits, very efficient cooling systems with small flow losses and high efficiency are necessary. Particularly with respect to operational reliability and avoiding damage to the components, it is then necessary to ensure that the cooling system is as insensitive as possible to faults. This is, for example, achieved by installing a plurality of units, which operate in parallel and adjacent to one another in the cooling medium flow, instead of a single large cooling unit. Compensation for the failure of a cooling unit can, by this means, be at least partially provided by other units and destruction of the components due to overheating can be substantially avoided.

In modern generators, even the use of a plurality of cooling units operating in parallel cannot prevent components suffering damage in the case of a failure of even one unit. If, namely, a cooling unit fails, hot gas streaks immediately form behind the failed unit (behind in the flow direction) and these lead, within an extremely short time, to the critical material temperatures being exceeded in the components over which flow occurs. The situation is particularly critical in the case of the failure of boundary coolers because, in this case, strong and substantially isolated hot gas streaks occur immediately.

SUMMARY OF THE INVENTION

The invention is therefore based on the object of making means available in which the formation of hot gas streaks is prevented in the case of the failure of individual coolers, major modification to the conventionally used cooling systems does not become necessary no significant pressure losses are generated.

This object is achieved, in a generator of the type mentioned at the beginning, by providing means which mix together the cooling medium flows flowing from different cooling units after they emerge from the cooling units and before they are supplied to the heat-generating elements of the generator.

A first preferred embodiment of the invention is characterized in that the mixing is effected by rigid guide plates being mounted in an equalizing space arranged downstream of the cooling units, which guide plates deflect the various cooling medium flows.

A further embodiment is characterized in that the guide plates mix together the cooling medium flows from respectively adjacent cooling units. This is, in particular, advantageous because antarbitrary number of cooling units, which are connected in parallel adjacent to one another, together with the guide plates can be provided in a modular manner and because it is possible to dispense with a bundling arrangement for the flows.

Another embodiment is based on the fact that the guide plates are arranged in the equalizing space in such a way that the cooling medium flows are provided with a vortex when they are mixed together. The result of this is that the mixing takes place much more efficiently.

In a particularly preferred embodiment, at least two guide plates are present which—starting from the sides adjoining one another of the adjacent cooling units—are extended to a ceiling level above the outlet surface of the cooling units in such a way that they engage in-one another in saw-tooth fashion in an alternating manner inclined towards the side of the one and of the other adjacent cooling unit. By this means, the equalizing space is subdivided into a distribution space and a mixing space, the distribution space being located directly behind the cooling units in the flow direction of the cooling medium and the mixing space being arranged immediately behind the distribution space in the flow direction of the cooling medium. The cooling medium flows of adjacent cooling units are mixed, in the mixing space, by the deflection at the guide plates in such a way that they are subjected to vortices when flowing from the distribution space to the heat-generating elements of the generator. In addition, a further advantage follows from the fact that the partial flows have counterflow relative to one another due to this guidance system and this, in the case of a failure of one unit, has the result of optimum heat exchange, due to the counterflow cooling, between the uncooled hot and cooled cooling medium flows.

Further embodiments are given by the subclaims.

BRIEF DESCRIPTION OF THE FIGURES

The invention is to be explained in more detail below using embodiment examples in association with the drawings. In these

DETAILED DESCRIPTION OF THE INVENTION

Figure 1:
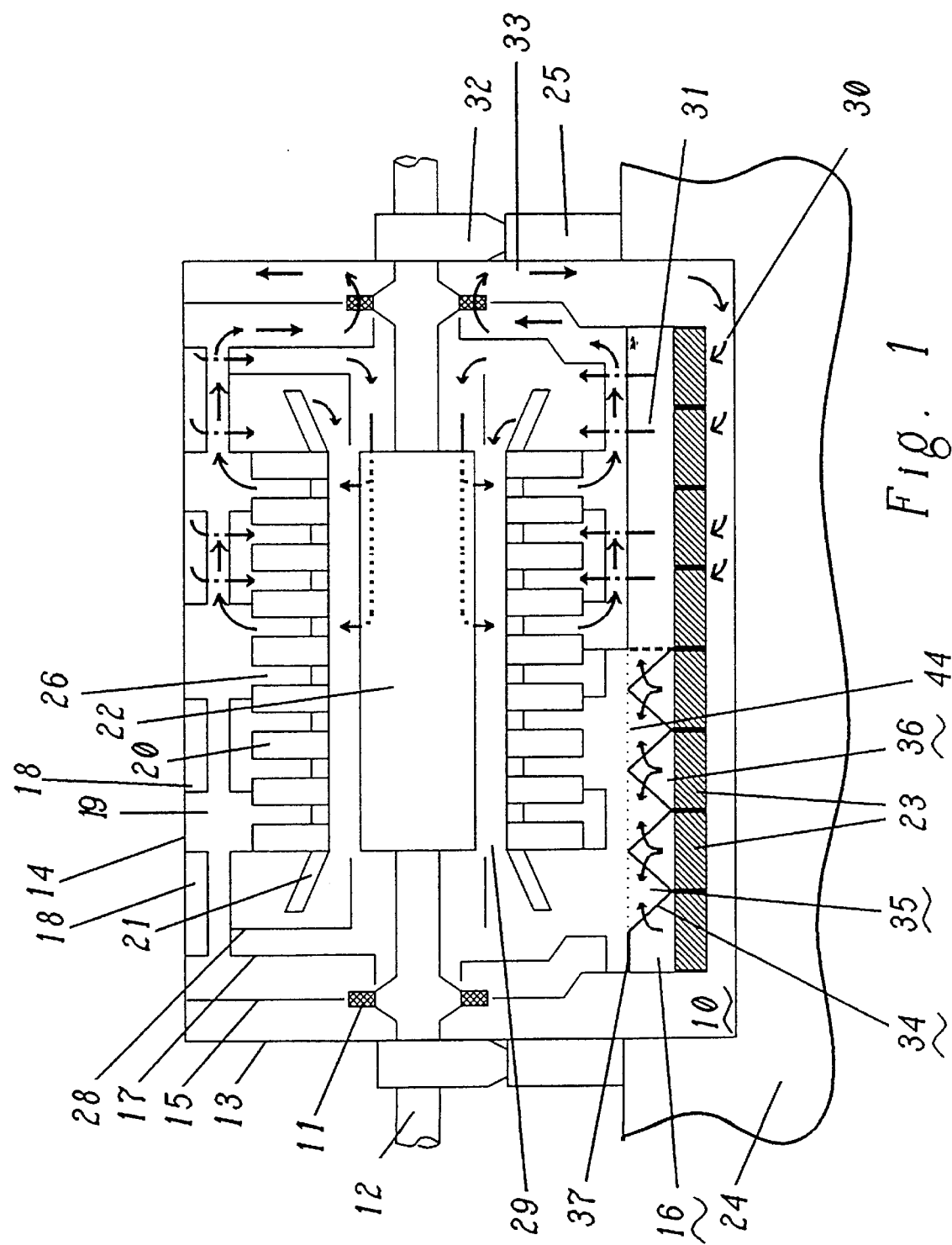
FIG. 1 shows a diagrammatic representation of a generator with suction cooling principle and mixing of the cooling medium in the equalizing space.

FIG. 1 shows a diagrammatic longitudinal section through a generator operated on the suction cooling principle. The generator is bounded at the front and back by machine casing covers 13 and is longitudinally enclosed by an essentially cylindrical machine casing 14. The casing encloses a stator lamination body formed from partial lamination bodies 20, radial ventilation slots 26 being present in the stator lamination body between the various partial lamination bodies 20. A rotor 22 is located in the centre of the stator lamination body and the associated rotor shaft 12 is supported in bearing pedestals 32, which are located on brackets 25 erected on a foundation 24.

The foundation 24 has a foundation pit 10, which extends axially over the complete length of the machine casing 24 and essentially includes the total width of the machine casing 24. A cooling arrangement consisting of a plurality of cooling, units 23 is arranged in this foundation pit 10. In this arrangement, the inlet openings of the cooling unit 23 are connected to outlet spaces of main fans 11 arranged at both ends of the rotor 22 and the outlet openings of the cooling units 23 open into an equalizing space 16. The main fan 11 is solidly connected to the rotor shaft 12 and rotates with the same speed as the rotor 22.

The flow paths of cooling gas flowing through a generator are indicated by arrows- in the right-hand part of FIG. 1. This cooling principle involves so-called reverse or suction cooling in which hot gas 30, 32 is supplied to the cooling units 23 by means of fans 11. Behind the cooling units 23, in the flow direction, the cold cooling gas flow 31 is subdivided after the equalizing space 16 into the cold gas chambers 18 so that partial flows are formed. A first partial flow flows between guide plates 28 and an inner shell 17 directly to the rotor 22, a second partial flow flows through the winding head 21 into the machine air gap 29 between rotor and stator and a third cooling gas flow passes through the cold gas chambers 18 and ventilation slots 26 into the machine air gap 29. The cooling gas flow is drawn in from the machine air gap 29 by the main fans 11 through ventilation slots 26 and the hot gas chambers 19 between an inner shell 17 and an outer shell 15. The air 32 driven by the main fan 11 is then deflected and led through the cooling duct casing 33 into the foundation pit 10 and to the cooling units 23. It can now be easily realized that in the case, for example, of failure of the boundary-end cooling unit, the winding head 21 will heat up rapidly because a hot gas streak forms precisely at this location.

The left-hand half of FIG. 1 indicates how guide plates 34 can be arranged in the equalizing space 16 over the various cooling units 23 in the equalizing space 16. The latter is subdivided by the guide plates 34 into distribution spaces 36 and mixing spaces 35 and, in this arrangement, the guide plates 34 form—in side view—an essentially zigzag-shaped wall. The guide plates 34 do not, however, separate the distribution space 36 and the mixing space 35 from one another but, rather, engage with one another in saw-toothed manner segmentally at right angles to the section plane of FIG. 1 and permit the medium to flow through.

Figure 2:
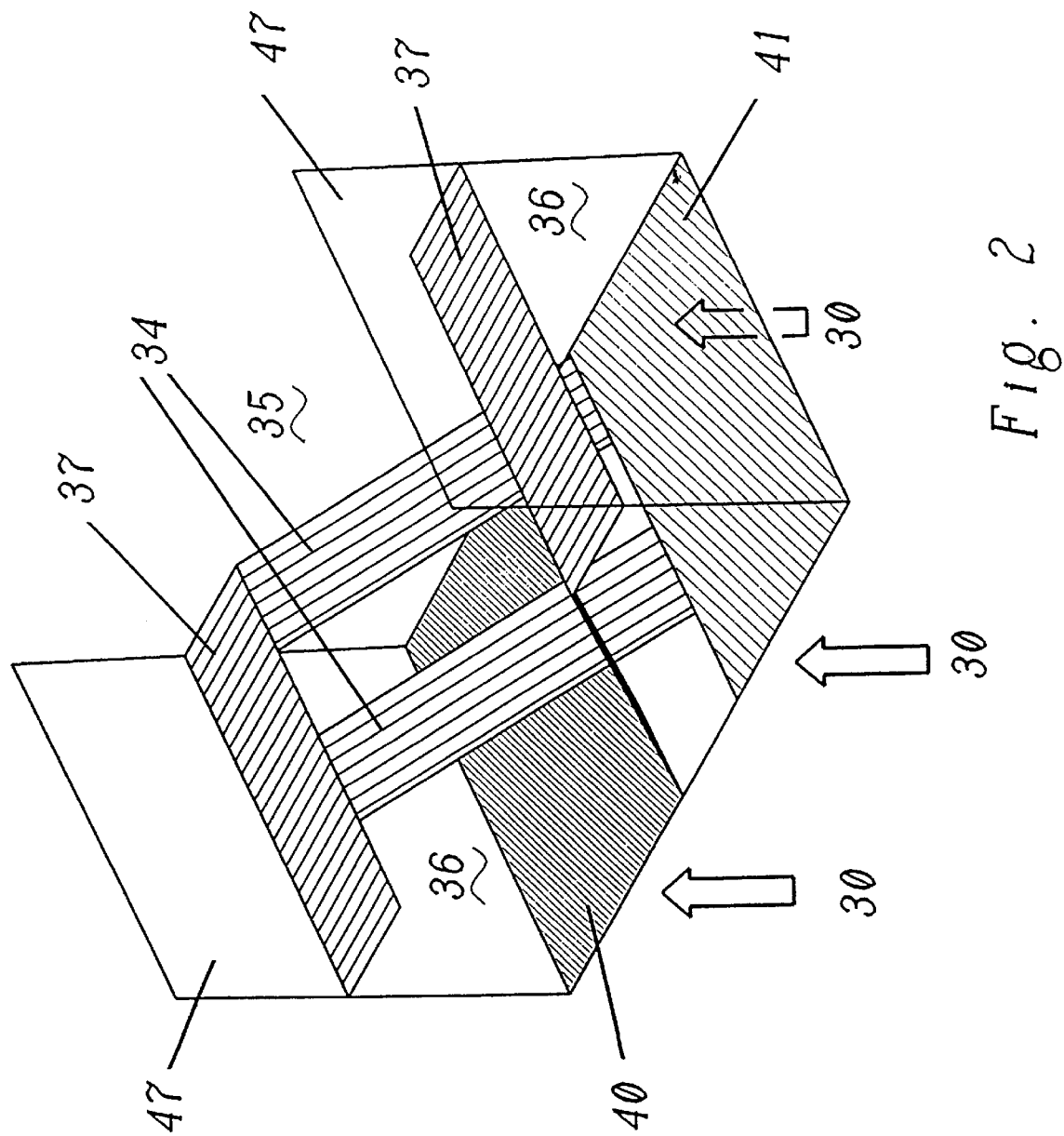
FIG. 2 shows a perspective view of an excerpt of an equalizing space with guide plates.

FIG. 2 shows a perspective view of the arrangement of the guide plates 34 in the equalizing space for two adjacently arranged cooling units. The engagement of the guide plates 34 within one another in inclined saw-tooth manner may be seen. If it is assumed that one unit 40 of the cooling units 23 is no longer functional whereas the adjacent unit 41 still operates, hot air flows out of the unit 40 and cold air flows out of the unit 41. Because of the guide plates 34, cold and hot cooling medium flows are now mixed in counterflow and subjected to vortices when passing through the slots between the guide plates 34. In the situation of two adjacently arranged cooling units 23 shown in FIG. 2, it is found to be advantageous for the outlet flow behaviour of the cooling medium to be particularly influenced at the sides by the use of cover plates 37. Such cover plates 37 extend, adjoining the side walls 47 and parallel to the outlet surfaces of the cooling unit 23, at the ceiling level 44 at which the sides of the guide plates 34 facing away from the cooling units 23 meet. By this means, the cover plates 37 abut the upper edges of the guide plates 34 inclined towards them and ensure that the whole of the cooling medium flowing out of the cooling unit 23 located underneath is mixed with the medium flowing out of the adjacent unit and that, in the case of the failure of one unit, no boundary-end streaks of hot cooling medium can form.

Figure 3:
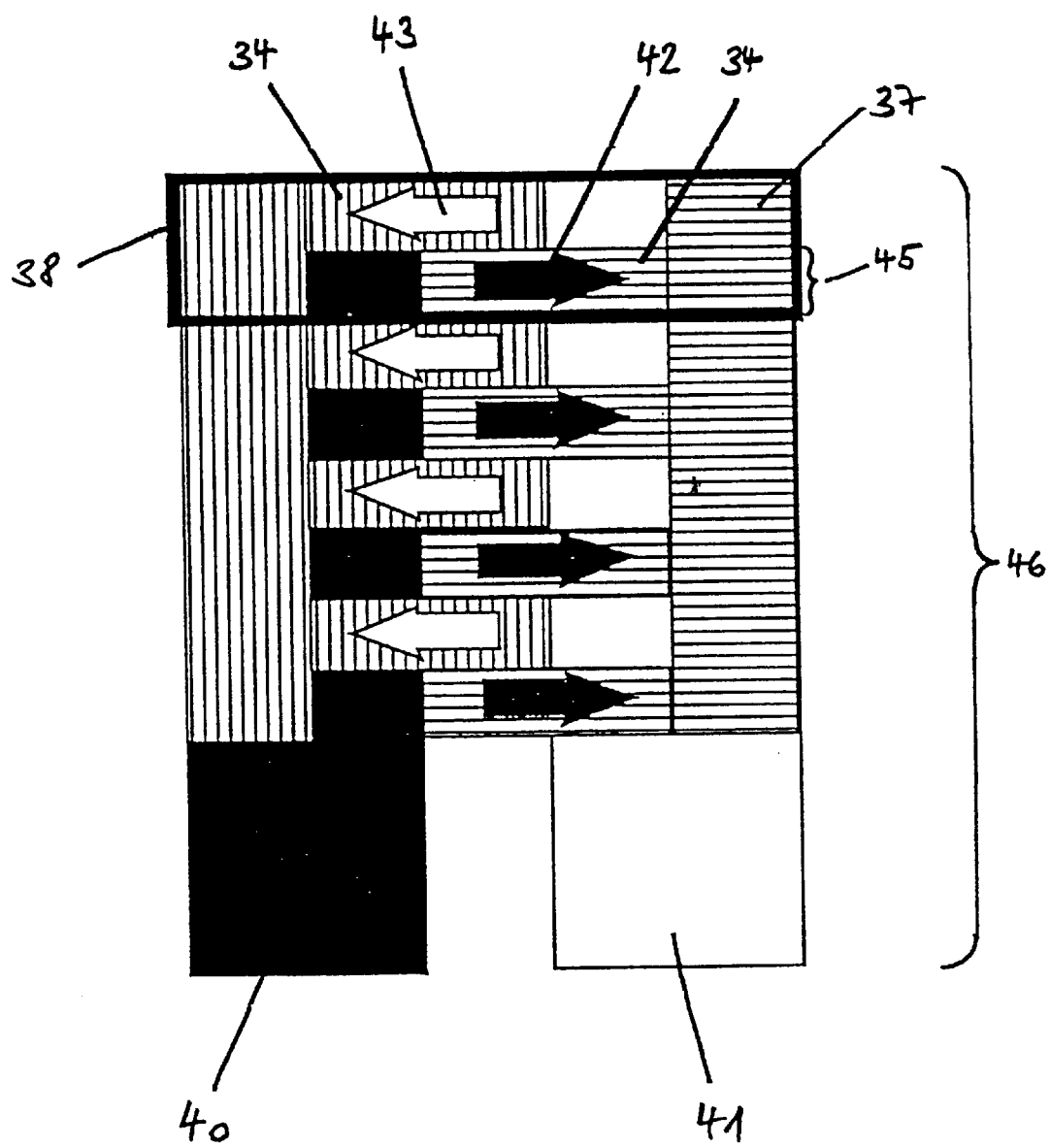
FIG. 3 shows a plan view of an equalizing space with lateral contiguous arrangement of guide plates.

FIG. 3 shows the situation of FIG. 2 in a plan view. In this case also, it is assumed that the black cooling unit 40 is not functional whereas the other cooling unit 41 functions satisfactorily. The hot air 42 flowing out of the faulty unit 40 is indicated by black arrows and the cooled air flowing out of the functional unit 41 is shown by white arrows 43. The counterflow mixing of the flows 42 and 43 may be clearly recognized in the plan view. The counterflow leads to optimum heat exchange between and mixing of the two flows 42 and 43. The guide plates 34 can be alternately arranged adjacent to one another to correspond with the width 46 of the units 23. Depending on the requirements, mixing cells 38 consisting of two oppositely extending guide plates 34 can, for example, be arranged adjacently in modular fashion. The relationship between the width 46 of the cooling units 23 and the mixing cells 38 can, in principle, be freely selected but it is found that a ratio of the guide plate width 45 to the unit width 46 of between $1/10$ and $1/15$ is particularly advantageous. If, in addition, the slope of the guide plates 34 relative to the outlet surface of the cooling units 23 is set to between 25° and 30° and a total height of the equalizing space 16 (between the outlet plane of the cooling units and the top edge of the foundation pit) of between 1 and 1.5 m is permitted, the result is optimum flow and mixing of the cooling air.

Figure 4:
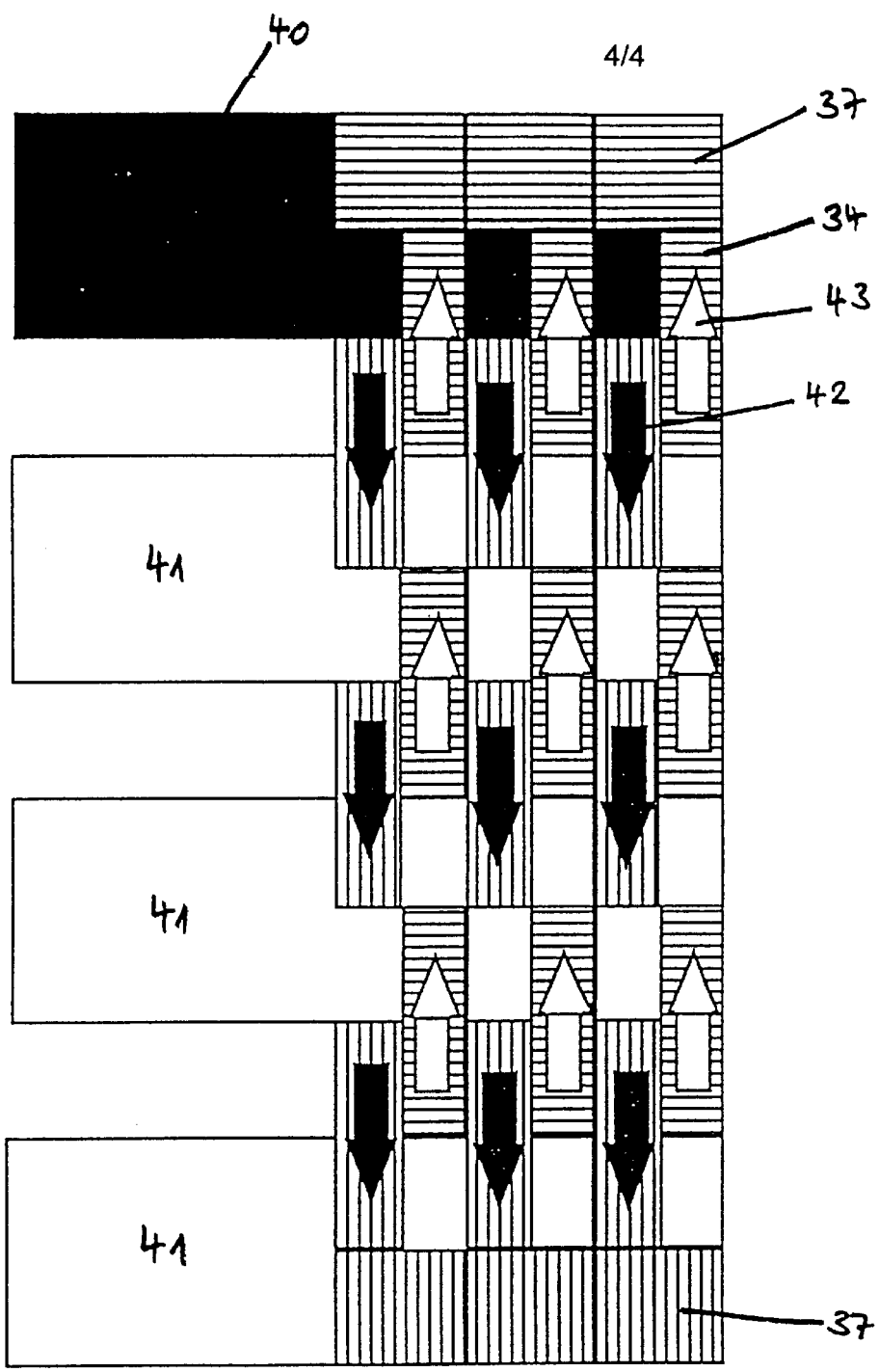
FIG. 4 shows a plan view of several contiguously arranged cooling units with guide plates.

FIG. 4 shows, in a plan view, how the above cooling medium mixing concept can also be applied to a plurality of cooling units 23 arranged adjacent to one another. In this arrangement, the guide plates 34 are arranged so that they simply engage relative to one another with respect to adjacently located units 23. In this way, the air which flows out of one unit, which is adjacent to two further units, is mixed with the air from both adjacent units. In order to avoid the particularly critical boundary-end hot air streaks, it is again necessary to extend cover plates 37 at the boundary end coolers.

Arrangements of guide plates other than those described in the above embodiment example are, of course, possible and the inventive idea can be realized in a similar manner.

It is, for example, conceivable to additionally tilt the guide plates sideways or to structure them so that they are not flat but are in an aerodynamically favourable shape.

What is claimed is:

1. A generator with a cooling system which draws in, from the generator, cooling medium heated by the heat-generating elements of the generator and which guides the hot cooling medium to at least two cooling units, which cooling units operate in parallel and cool the cooling medium before it is led back to the heat-generating elements of the generator, wherein means are provided which mix together the cooling medium flows flowing from different cooling units after they emerge from the cooling units and before they are supplied to the heat-generating elements of the generator; and wherein the mixing of the cooling medium flows flowing from different cooling units which occurs in an equalizing space located, in the flow direction of the cooling medium, behind the cooling units and before the heat-generating elements of the generator, and takes place in the equalizing space by means of rigid guide plates which deflect the various cooling medium flows.

2. The generator according to claim 1, wherein the cooling system operates on the suction cooling principle, in which a main fan attached to a rotor shaft draws in the cooling medium heated by the heat-generating elements of the generator and then drives it to the cooling units.

3. The generator according to claim 1, wherein the cooling units are arranged in a foundation pit which partially accommodates the generator.

4. The generator according to claim 3, wherein the generator has available a plurality of cooling units, which operate in parallel, which essentially extend over the width of the foundation pit and which, at least indirectly, adjoin one another at their sides.

5. The generator according to claim 1, wherein the cooling medium flowing from respectively adjacent cooling units is mixed.

6. The generator according to claim 5, wherein the deflection of the cooling medium flows of adjacent cooling units takes place by means of guide plates in such a way that the cooling medium flows are provided with a vortex when they are mixed together.

7. The generator according to claim 6, wherein at least two guide plates are arranged in the equalizing space, in that—starting from the sides adjoining one another of the adjacent cooling units the guide plates extend to a ceiling level above the outlet surface of the cooling units in such a way that they engage in one another in saw-tooth fashion in an alternating manner inclined towards the side of the one and of the other adjacent cooling unit, so that the equalizing space is subdivided into a distribution space and a mixing space, the distribution space being located directly behind the cooling units in the flow direction of the cooling medium and the mixing space being arranged immediately behind the distribution space in the flow direction of the cooling medium, and the cooling medium flow of adjacent cooling units being mixed, in the mixing space, by the deflection at the guide plates in such a way that it is subjected to vortices when flowing from the distribution space to the heat-generating elements of the generator.

8. The generator according to claim 7, wherein the guide plates are inclined and configured in such a way that, respectively starting from the side of the adjoining adjacent cooling unit, they meet the ceiling level essentially above the centre of the next cooling unit.

9. The generator according to claim 8, wherein in the equalizing space, additional cover plates extend in the axial direction of the generator at the outside and therefore boundary-end cooling units, which cover plates are located at the ceiling level aligned parallel with the outlet surface of the cooling units, extend over the complete width of the cooling units and which are so wide that they adjoin the guide plates which start from the side of the adjacent cooling unit.

10. The generator according to claim 1, wherein the height between the outlet surface of the cooling units and the upper edge of the foundation pit is located in a range between 1 and 1.5 m, in that the guide plates enclose an angle of between 25 and 30° relative to the plane of the outlet surface of the cooling units, and in that the width, measured transverse to the main axis of the generator, of all the guide plates is the same and amounts to between $1/10$ and $1/15$ of the total width of the cooling units.

* * * * *